United States Patent
Yang et al.

(10) Patent No.: US 10,345,852 B2
(45) Date of Patent: Jul. 9, 2019

(54) WEARABLE DISPLAY DEVICE AND DISPLAY MODULE THEREOF

(71) Applicant: AMTRAN TECHNOLOGY CO.,LTD, New Taipei (TW)

(72) Inventors: Li-Chun Yang, New Taipei (TW); Po-Yu Chou, New Taipei (TW); Yuan-Chieh Chang, New Taipei (TW)

(73) Assignee: AMTRAN TECHNOLOGY CO., LTD., New Taipei (TW)

( * ) Notice: Subject to any disclaimer, the term of this patent is extended or adjusted under 35 U.S.C. 154(b) by 64 days.

(21) Appl. No.: 15/426,941

(22) Filed: Feb. 7, 2017

(65) Prior Publication Data
US 2018/0157453 A1    Jun. 7, 2018

(30) Foreign Application Priority Data
Dec. 7, 2016 (TW) .............................. 105140516 A

(51) Int. Cl.
| | |
|---|---|
| *G06F 1/16* | (2006.01) |
| *G02B 5/04* | (2006.01) |
| *G06T 19/00* | (2011.01) |
| *G02B 27/01* | (2006.01) |

(52) U.S. Cl.
CPC .............. *G06F 1/163* (2013.01); *G02B 5/04* (2013.01); *G02B 27/01* (2013.01); *G02B 27/0101* (2013.01); *G02B 27/017* (2013.01); *G06T 19/006* (2013.01)

(58) Field of Classification Search
CPC ........... G06F 3/147; G06F 1/163; G02B 5/04; G02B 27/01; G02B 27/0101; G02B 27/0132; G02B 27/017; G02B 27/0178; G06T 19/006

USPC ......................................................... 345/7, 8
See application file for complete search history.

(56) References Cited

U.S. PATENT DOCUMENTS

| | | | | |
|---|---|---|---|---|
| 4,582,393 A | * | 4/1986 | Shieman | G02B 27/26 348/42 |
| 4,744,633 A | * | 5/1988 | Sheiman | G02B 27/26 351/201 |
| 4,982,278 A | * | 1/1991 | Dahl | G02B 27/017 348/53 |
| 5,757,546 A | * | 5/1998 | Lipton | G02B 27/2264 359/464 |
| 6,731,254 B2 | * | 5/2004 | Maeda | G02B 27/0172 345/8 |

(Continued)

*Primary Examiner* — Jason M Mandeville
(74) *Attorney, Agent, or Firm* — Maschoff Brennan

(57) ABSTRACT

A wearable display device comprises a casing, a display panel, a lens and a prism. The display panel is disposed on the casing, and has two planes connected to each other. An angle between the planes is greater than 0 degrees and less than 180 degrees. The lens is disposed on the casing, and faces the planes. The prism is disposed between the display panel and the lens, and comprises two refractive portions. Each refractive portion has a light-incoming surface and a light-outgoing surface. The light-incoming surfaces respectively face the planes of the display panel. The light-outgoing surfaces face the lens. An angle between the light-outgoing surfaces is greater than 0 degrees and less than 180 degrees. One of the light-incoming surfaces is parallel to one of the planes of the display panel. The other light-incoming surface is parallel to the other plane of the display panel.

18 Claims, 6 Drawing Sheets

(56) References Cited

U.S. PATENT DOCUMENTS

| | | | | |
|---|---|---|---|---|
| 7,242,522 B2* | 7/2007 | Kanai | ............... | G02B 25/004 |
| | | | | 359/407 |
| 8,477,439 B2* | 7/2013 | Imai | ............... | G02B 27/2242 |
| | | | | 359/834 |
| 8,593,746 B2* | 11/2013 | Imai | ............... | G02B 27/2242 |
| | | | | 359/834 |
| 2009/0059366 A1* | 3/2009 | Imai | ............... | G02B 27/2242 |
| | | | | 359/464 |
| 2011/0261451 A1* | 10/2011 | Kwrk | ............ | G02B 27/2264 |
| | | | | 359/465 |
| 2015/0103152 A1* | 4/2015 | Qin | ........... | G02B 13/08 |
| | | | | 348/53 |

* cited by examiner

WEARABLE DISPLAY DEVICE AND DISPLAY MODULE THEREOF

CROSS-REFERENCE TO RELATED APPLICATIONS

This non-provisional application claims priority under 35 U.S.C. § 119(a) on Patent Application No(s). 105140516 filed in Taiwan, R.O.C. on Dec. 7, 2016, the entire contents of which are hereby incorporated by reference.

TECHNICAL FIELD

The disclosure relates to a display device and a display module, more particularly a wearable display device and a display module thereof.

BACKGROUND

With the development of technology, wearable display devices have been widely used in video, film, medicine, simulation training, games and other fields. In recent years, a head-mounted display (HMD) configured for Virtual Reality (VR) or Augmented Reality (AR) has been developed. Generally, a conventional wearable display device configured for virtual reality includes a casing, a flat-panel display and a convex lens. The convex lens converts an image of the flat-panel display into a stand upright virtual image. When wearing the wearable display device, a user can receive various kinds of sensory simulations provided by the computers or the electronic devices through a specific media and experience a virtual world.

SUMMARY

One embodiment of the disclosure provides a wearable display device comprising a casing, a display panel, a lens and a prism. The display panel is disposed on the casing, and the display panel has two planes connected to each other. An angle between the two planes is greater than 0 degrees and less than 180 degrees. The lens is disposed on the casing, and the lens faces the planes of the display panel. The prism is disposed between the display panel and the lens. The prism comprises two refractive portions, and each of the refractive portions has a light-incoming surface and a light-outgoing surface not parallel to each other. The light-incoming surfaces respectively face the planes of the display panel, and the light-outgoing surfaces face the lens. An angle between the light-outgoing surfaces is greater than 0 degrees and less than 180 degrees. One of the light-incoming surfaces is substantially parallel to one of the planes of the display panel, and the other one of the light-incoming surfaces is substantially parallel to the other one of the planes of the display panel.

One embodiment of the disclosure provides a display module comprising a display panel and a prism. The display panel has two planes connected to each other. An angle between the two planes is greater than 0 degrees and less than 180 degrees. The prism comprises two refractive portions, and each of the refractive portions has a light-incoming surface and a light-outgoing surface. The light-incoming surfaces respectively face the planes of the display panel. An angle between the light-outgoing surfaces is greater than 0 degrees and less than 180 degrees. One of the light-incoming surfaces is substantially parallel to one of the planes of the display panel, and the other one of the light-incoming surfaces is substantially parallel to the other one of the planes of the display panel.

One embodiment of the disclosure provides a wearable display device, comprising a casing, a display member, a lens and a prism. The display member is disposed on the casing. The display member comprises two display panels, and each of the display panels has a plane. An angle between the planes is greater than 0 degrees and less than 180 degrees. The lens is disposed on the casing, and the lens faces the planes of the display panels of the display member. The prism is disposed between the display panels and the lens. The prism comprises two refractive portions, and each of the refractive portions has a light-incoming surface and a light-outgoing surface not parallel to each other. The light-incoming surfaces respectively face the display panels, and the light-outgoing surfaces face the lens. An angle between the light-outgoing surfaces is greater than 0 degrees and less than 180 degrees. One of the light-incoming surfaces is substantially parallel to one of the planes of the display panels, and the other one of the light-incoming surfaces is substantially parallel to the other one of the planes of the display panels.

One embodiment of the disclosure provides a display module comprising a display member and a prism. The display member comprises two display panels, and each of the display panels has a plane. An angle between the planes of the display panels is greater than 0 degrees and less than 180 degrees. The prism comprises two refractive portions, and each of the refractive portions has a light-incoming surface and a light-outgoing surface. The light-incoming surfaces respectively face the planes of the display panels. An angle between the light-outgoing surfaces is greater than 0 degrees and less than 180 degrees. One of the light-incoming surfaces is substantially parallel to one of the planes of the display panels, and the other one of the light-incoming surfaces is substantially parallel to the other one of the planes of the display panels.

BRIEF DESCRIPTION OF THE DRAWINGS

The present disclosure will become more fully understood from the detailed description given hereinbelow and the accompanying drawings which are given by way of illustration only and thus are not intending to limit the present disclosure and wherein.

DETAILED DESCRIPTION

Figure 1:
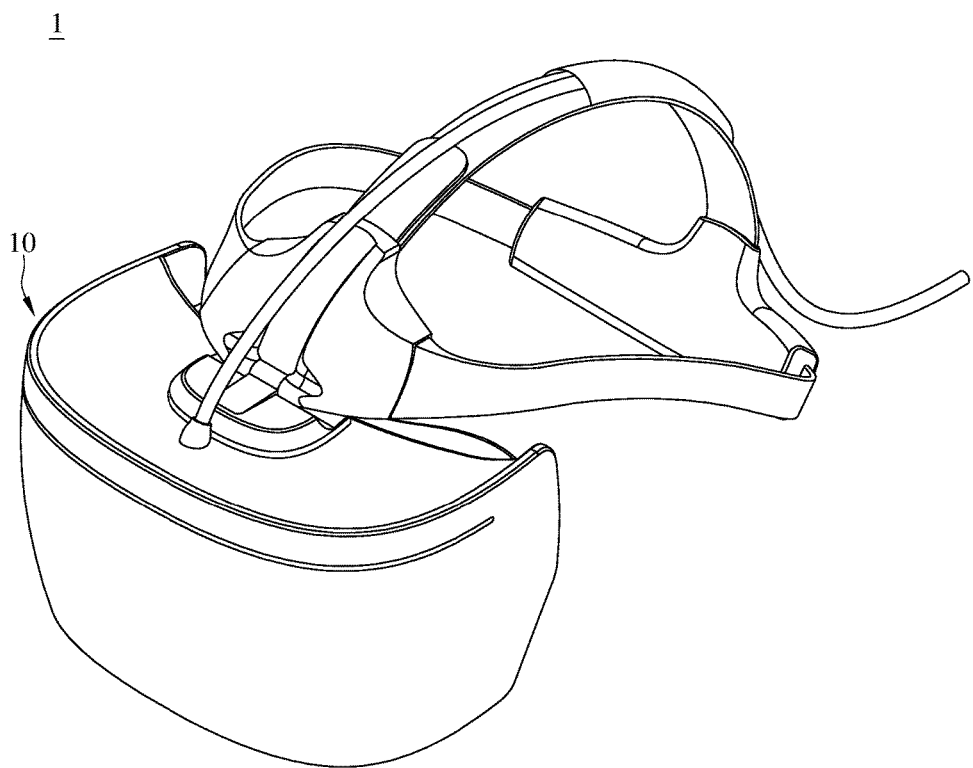
FIG. 1 is a perspective view of a wearable display device in accordance with a first embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 2:
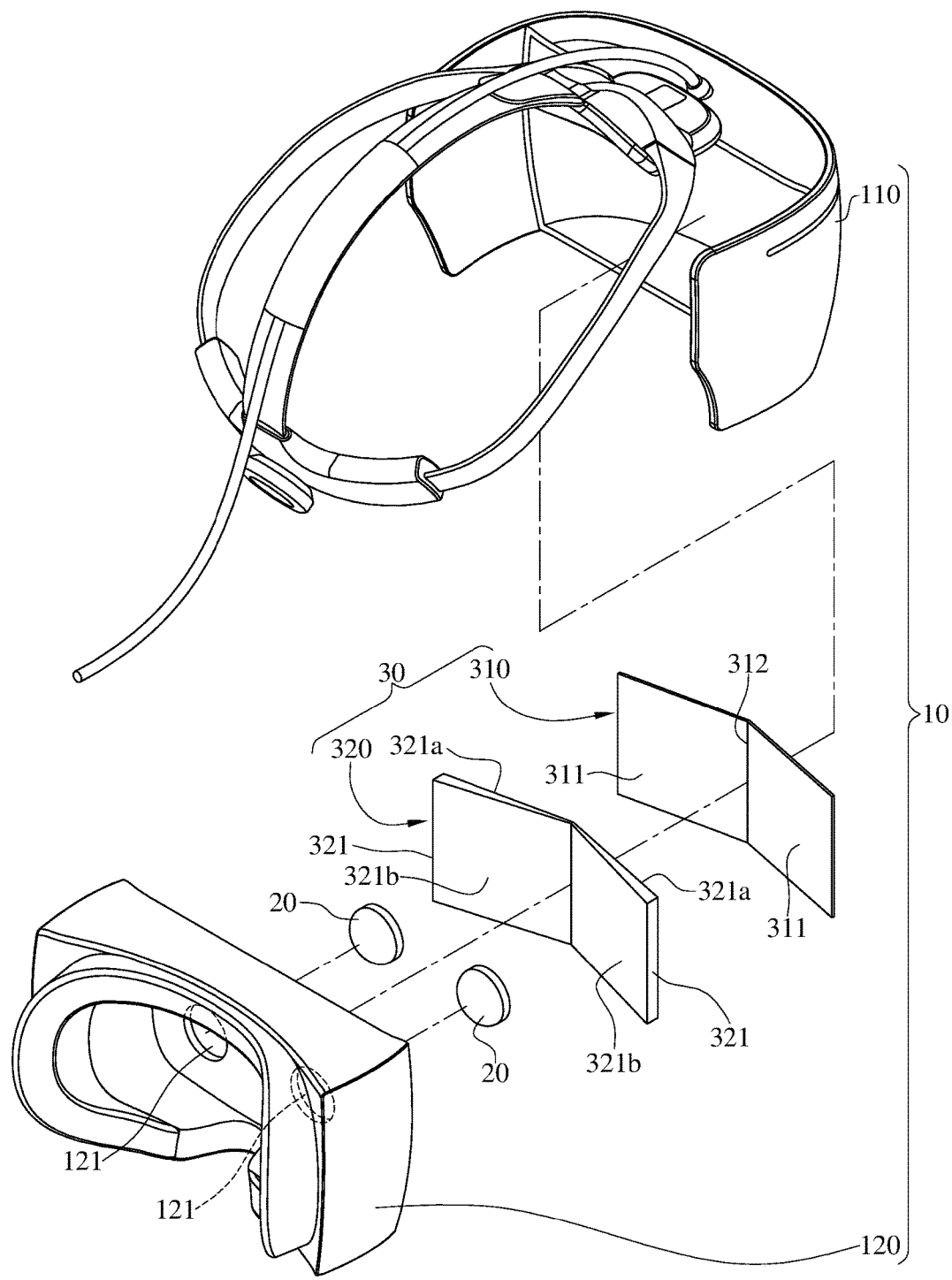
FIG. 2 is an exploded view of the wearable display device in FIG. 1.
Figure 3:
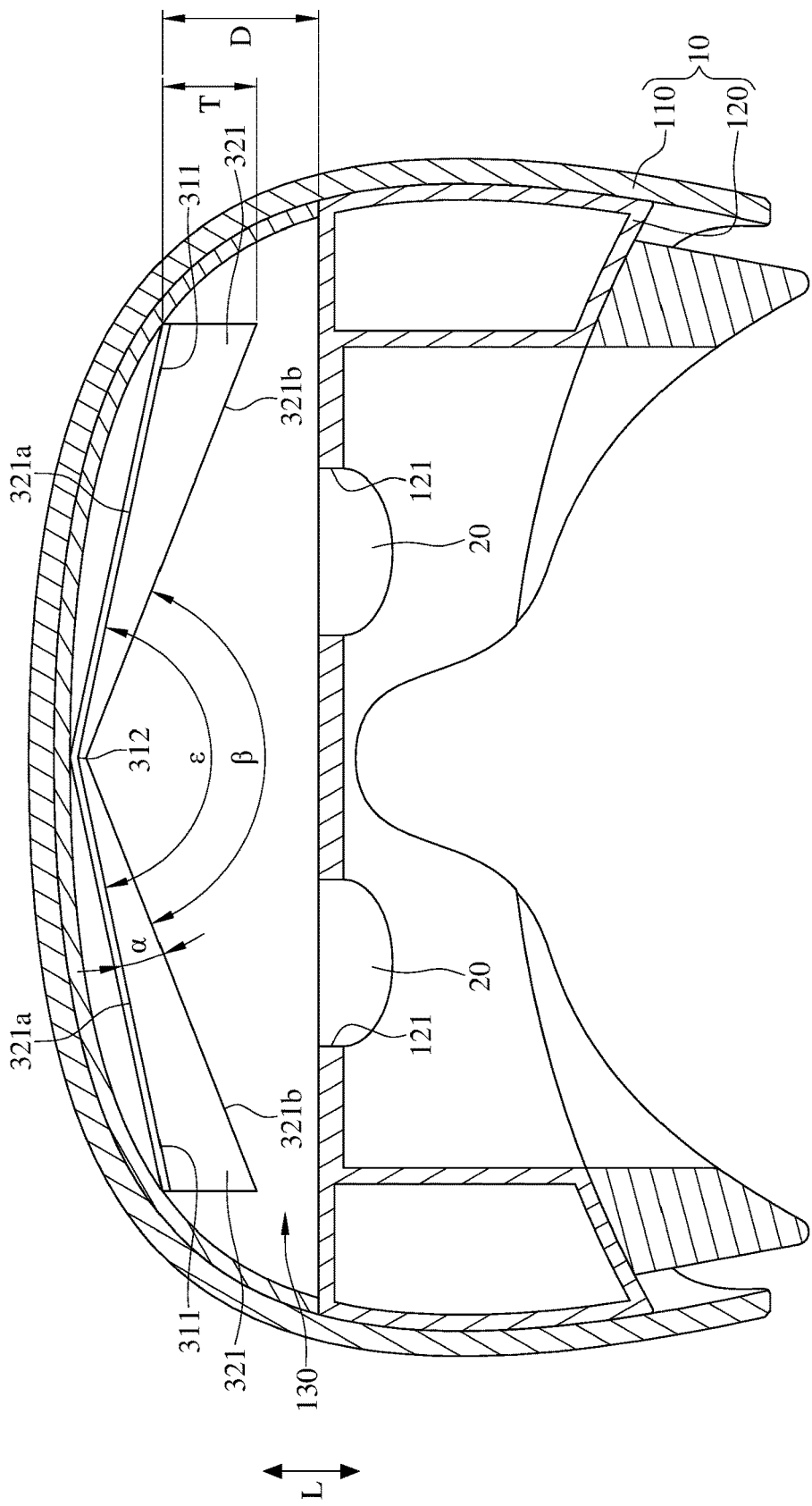
FIG. 3 is a cross-sectional view of the wearable display device in FIG. 1.

Please simultaneously refer to FIG. 1 to FIG. 3. FIG. 1 is a perspective view of a wearable display device in accordance with a first embodiment of the disclosure. FIG. 2 is an exploded view of the wearable display device in FIG. 1. FIG. 3 is a cross-sectional view of the wearable display device in FIG. 1. In this embodiment, a wearable display device 1 includes a casing 10, two lenses 20 and a display module 30. The wearable display device 1 is, for example, a Virtual Reality (VR) head-mounted display, or an Augmented Reality (AR) head-mounted display, but the present disclosure is not limited thereto.

The casing 10 includes a cover 110 and a bearing base 120. The bearing base 120 is disposed on the cover 110. The cover 110 and the bearing base 120 together form a storage space 130 therebetween. The bearing base 120 has two through holes 121 connected to the storage space 130.

The lenses 20 are, for example, convex lenses, but the present disclosure is not limited thereto. The lenses 20 are disposed in the through holes 121 of the bearing base 120 of the casing 10. The lenses 20 are made of, for example, glass or plastic, but the present disclosure is not limited thereto. In this embodiment, the lenses 20 are respectively disposed in the through holes 121 of the bearing base 120, but the present disclosure is not limited thereto. In other embodiments, the wearable display device may have only one lens and one bearing base.

The display module 30 includes a display panel 310 and a prism 320. The display panel 310 is, for example, a liquid crystal display (LCD) or an organic light emitting diode display (OLED) to display images and videos, but the present disclosure is not limited thereto. The display panel 310 is disposed in the storage space 130 of the casing 10. The display panel 310 has a connection line 312 and two planes 311, the two planes 311 are connected to each other at the connection line 312. Both the planes 311 extend from the connection line 312 along a direction pointing toward the lenses 20. An angle ε is between the planes 311, and the angle ε is greater than 0 degrees and less than 180 degrees.

The prism 320 is disposed between the display panel 310 and the lenses 20. The prism 320 is made of, for example, glass or plastic, but the present disclosure is not limited thereto. The prism 320 includes two refractive portions 321 connected to each other. The thickness of each of the refractive portions 321 increases along a direction pointing toward the lenses 20. A maximum thickness T of each of the refractive portions 321 is less than or equal to a minimum distance D between the display panel 310 and the lenses 20, such that the prism 320 is able to be completely accommodated in the storage space 130.

Each of the refractive portions 321 has a light-incoming surface 321a and a light-outgoing surface 321b. In detail, an angle α is between the light-incoming surface 321a and the light-outgoing surface 321b of each of the refractive portions 321, and the angle α is less than 180 degrees. The light-incoming surface 321a and the light-outgoing surface 321b are respectively located on the opposite sides of each of the refractive portions 321. The light-incoming surfaces 321a respectively face the corresponding planes 311 of the display panel 310, and the light-incoming surfaces 321a are respectively and directly in contact with the planes 311. The light-outgoing surfaces 321b both face the lenses 20. An angle β is between the light-outgoing surfaces 321b, and the angle β is greater than 0 degrees and less than 180 degrees.

One of the light-incoming surfaces 321a of the refractive portions 321 is substantially parallel to one of the planes 311 of the display panel 310, and the other one of the light-incoming surfaces 321a of the refractive portions 321 is substantially parallel to the other one of the planes 311 of the display panel 310.

In this embodiment, the display panel 310 of the display module 30 has the two planes 311, and there is the angle c between the two planes 311. Thus, the volume of the storage space 130 occupied by the display panel 310 is reduced, such that it is contributive for the cover 110 of the casing 10 to be small, thereby minimizing the size of the wearable display device 1. In this embodiment, when the display panel 310 is designed to have an angle between the two planes 311 of the display panel 310, the light coming from the planes 311 of the display panel 310 is not able to be parallel to an optical axis L of the lens 20, such that a stand upright virtual image generated by the lenses 20 has optical aberration and lower luminance. In order to solve the aforementioned problems, in this embodiment, the prism 320 is disposed between the display panel 310 and the lenses 20. As a result, when the light comes from the planes 311 of the display panel 310 passes through the prism 320, a direction of light is redirected to a direction parallel to the optical axis L of the lens 20.

Figure 4:
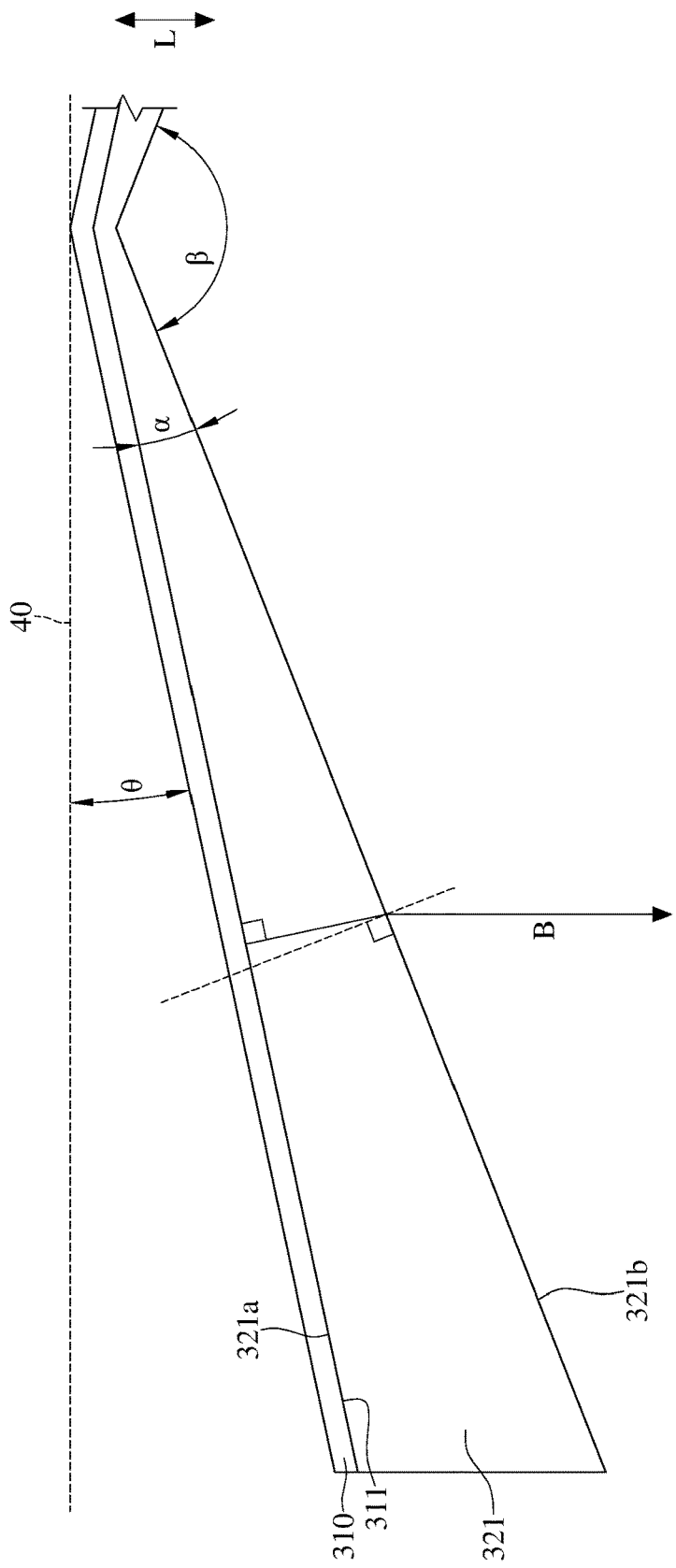
FIG. 4 is a partial enlarged view of the display module of the wearable display device in FIG. 3.

In this embodiment, a shape of the prism 320 is designed to redirect the direction of light. Please refer to FIG. 3 and further refer to FIG. 4. FIG. 4 is a partial enlarged view of the display module of the wearable display device in FIG. 3. A horizontal reference plane 40 is perpendicular to the optical axis L of the lens 20. The angle α is between the light-incoming surface 321a and the light-outgoing surface 321b of each of the refractive portions 321 of the prism 320, and an angle θ is between each of the light-incoming surfaces 321a of the prism 320 and the horizontal reference plane 40. A refractive index of the prism 320 is N1, and a refractive index of a medium between the light-outgoing surfaces 321b of the prism 320 and the lenses 20 is N2, and to satisfy a condition as following:

$$N1*\sin α = N2*\sin(α+θ).$$

When the condition is satisfied, the prism 320 is able to redirect a direction of light B to a direction parallel to the optical axis L of the lens 20; therefore, it is conducive to eliminating optical aberration and increasing the luminance of the stand upright virtual image which generated by the lens 20. Taking a specific design method for an example, when the angle θ between each of the light-incoming surfaces 321a and the horizontal reference plane 40 is 12.0 degrees, the refractive index of the prism 320 is 1.516, and the refractive index of the medium between the light-outgoing surfaces 321b of the prism 320 and the lenses 20 is 1 (i.e. the refractive index of air). Substitute the aforementioned values into the equation (N1*sin α=N2*sin(α+θ)), and the value of (α+θ) is approximately equal to 33.70 degrees. Then, subtract the value of the angle θ (12.0 degrees) from the value of (α+θ), and the value of the angle α is equal to 21.70 degrees. As a result, it can be seen that the angle α between each of the light-incoming surfaces 321a and each of the light-outgoing surfaces 321b is 21.70 degrees. In addition, by considering the values of the angle α and the angle θ as well as a predetermined width of the prism 320, the length of the prism 320 along a direction of the optical axis L of the lens 20 can be calculated, so that the size of the cover 110 of the casing 10 could be figured out and could provide a sufficient space for storage space 130 accommodating the display module 30.

The increase of the angle θ between each of the light-incoming surfaces 321a and the horizontal reference plane 40 can reduce the size of the wearable display device 1. However, in some cases, when the angle θ is bigger than a reference range, the display panel 310 tends to interfere with other components of the wearable display device 1 during assembling, and the length of the image of the display panel 310 is less than the vision field of a user, which results in a negative effect on user experience. In this embodiment, the angle θ between each of the light-incoming surfaces 321a and the horizontal reference plane 40 has the reference range, and it is favorable for keeping the size and weight of the wearable display device 1 thin and light and providing a good visual experience for users. In this embodiment, the angle θ between each of the light-incoming surfaces 321a of the prism 320 and the horizontal reference plane 40 satisfies the following condition: 0 [degrees]<θ<14.0 [degrees], but the present disclosure is not limited thereto. In other embodiments, the angle θ may further satisfy the following condition: 0 [degrees]<θ<12.0 [degrees]. Furthermore, in other embodiments, the angle θ may further satisfy the following condition: 10.0 [degrees]<θ<12.0 [degrees].

Figure 5:
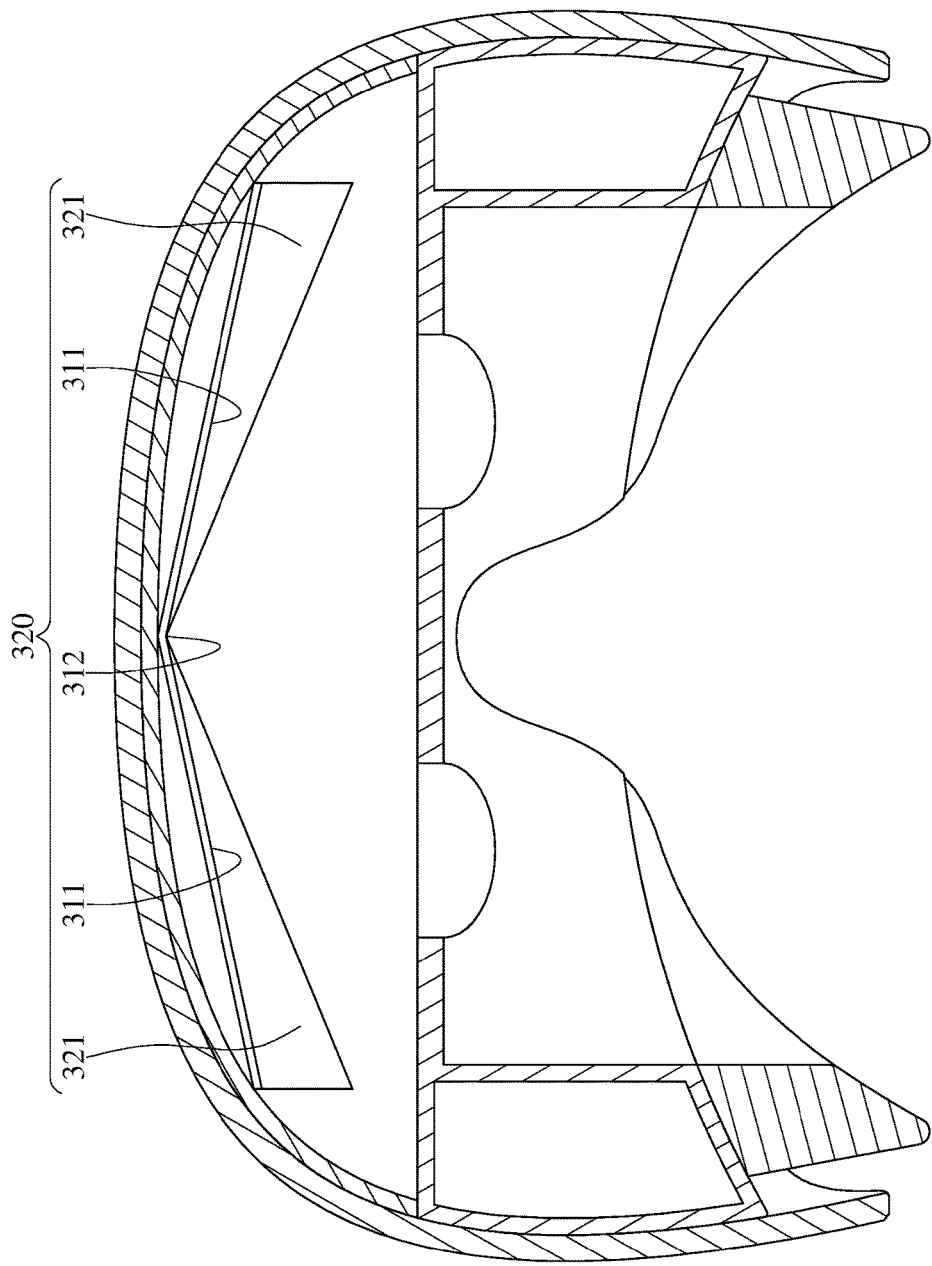
FIG. 5 is a cross-sectional view of a wearable display device in accordance with a second embodiment of the disclosure.

According to the first embodiment described above, the two refractive portions of the prism are integrally connected to each other, but the present disclosure is not limited thereto. Please refer to FIG. 5, which is a cross-sectional view of the wearable display device in accordance with a second embodiment of the disclosure. Since the second embodiment is similar to the first embodiment of the disclosure, only the differences between these embodiments are described in the following paragraphs.

In this embodiment, the two refractive portions 321 of the prism 320 are two independent objects. When the refractive portions 321 are disposed on the display panel 310, one side margin of each of the refractive portions 321 is in contact with the connection line 312 between the planes 311 of the display panel 310.

Figure 6:
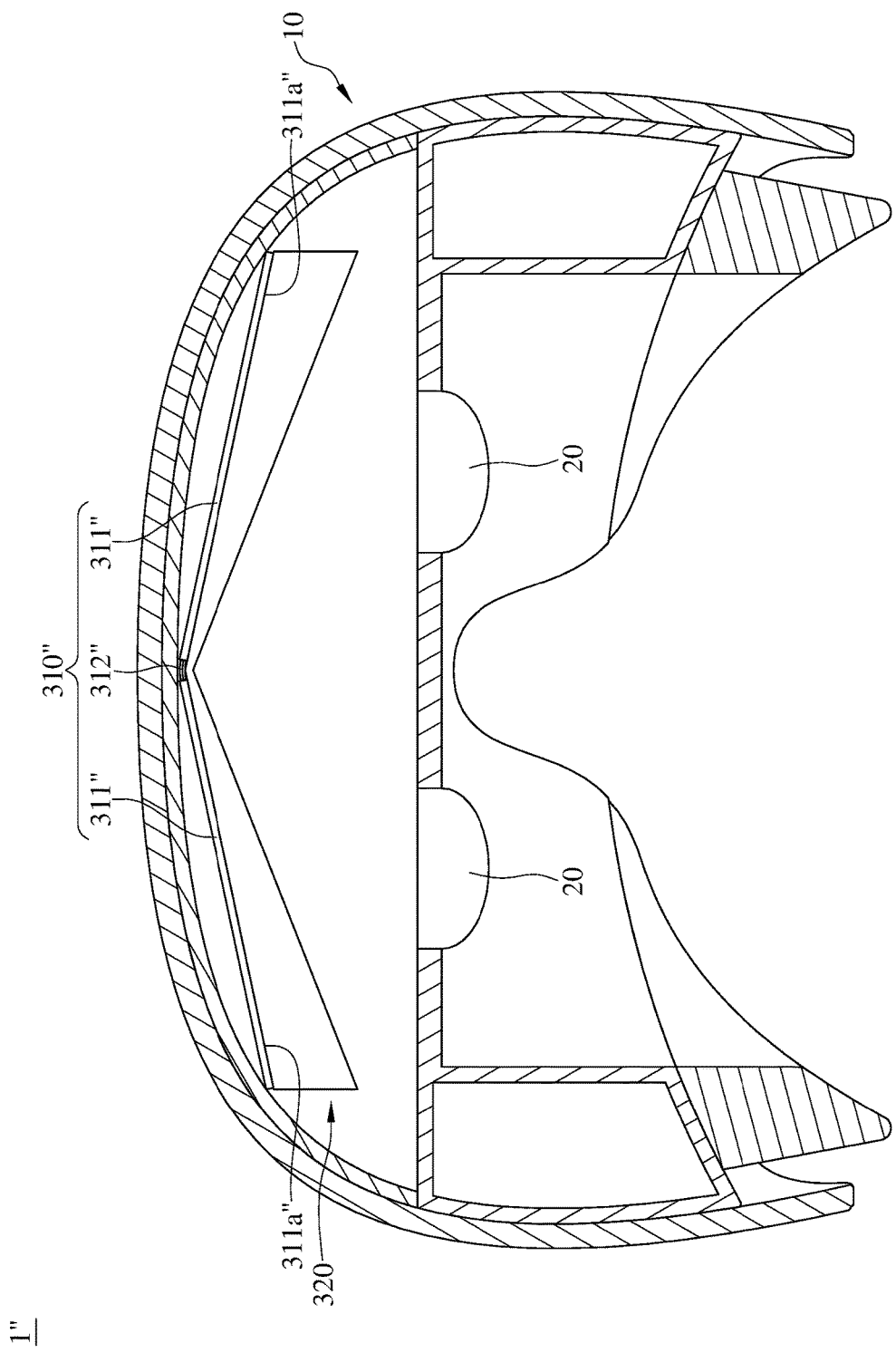
FIG. 6 is a cross-sectional view of a wearable display device in accordance with a third embodiment of the disclosure.

Among the first and the second embodiments of the disclosure, the display panel 310 is in one piece, and has two planes which are connected to each other at the connection line, but the present disclosure is not limited thereto, it could also be two separate display panels connected to each other. Please refer to FIG. 6, which is a cross-sectional view of a wearable display device in accordance with a third embodiment of the disclosure. Since the third embodiment is similar to the first and the second embodiments of the disclosure, only the differences between these embodiments are described in the following paragraphs.

In this embodiment, a wearable display device 1" includes a display member 310", and the display member 310" includes two display panels 311" and at least one signal cable 312". Each of the display panels 311" has a plane 311a". Two ends of the signal cable 312", which are opposite to each other, are respectively connected to the display panels 311". Both the planes 311a" of the display panels 311" extend from the signal cable 312" along a direction pointing toward the lenses 20.

According to the wearable display device as described above, the display panel has two planes connected to each other, and each of the two refractive portions of the prism has a light-incoming surface and a light-outgoing surface which are not parallel to each other. In addition, one of the light-incoming surfaces is substantially parallel to one of the planes of the display panel, and the other one of the light-incoming surfaces is substantially parallel to the other one of the planes of the display panel. Thus, the volume of the storage space occupied by the display panel is reduced, such that it is contributive for keeping the cover of the casing light and thin, thereby minimizing the size of the wearable display device. In addition, the prism is able to redirect a direction of light to a direction parallel to the optical axis of the lens, such that it is contributive for eliminating optical aberration and increasing the luminance of the stand upright virtual image which generated by the lens The arrangement of the display panel and the prism is contributive for keeping the size and weight of the wearable display device thin and light and providing a good visual experience for users.

Moreover, in stead of directly reducing the distance between the lens and the display panel, a distance between the lens and the display panel of the wearable display device of the present disclosure is sufficient to prevent the stand upright virtual image generated from the image of the display panel from becoming smaller, and also avoids the displacement of the stand upright virtual image. Therefore, the wearable display device of the present disclosure is small in size and light in weight, and is able to provide a good visual experience for users simultaneously.

The embodiments were chosen and described in order to best explain the principles of the disclosure and its practical applications, to thereby enable others skilled in the art to best utilize the disclosure and various embodiments with various modifications as are suited to the particular use contemplated. It is intended that the scope of the disclosure be defined by the following claims and their equivalents.

What is claimed is:

1. A wearable display device, comprising:
   a casing;
   a display panel disposed on the casing, the display panel having two planes connected to each other along a center line between the two planes, an angle between the two planes greater than 0 degrees and less than 180 degrees;
   a lens disposed on the casing, the lens facing the planes of the display panel; and
   a prism disposed between the display panel and the lens such that the prism, the display panel and the lens are stacked on top of each other, the prism comprising two planar refractive portions connected to each other at a center of the prism along the center line, each of the refractive portions having a light-incoming surface and a light-outgoing surface not parallel to each other, each of the light-incoming surfaces respectively facing one of the planes of the display panel, each of the light-outgoing surfaces facing the lens, an angle between the light-outgoing surfaces greater than 0 degrees and less than 180 degrees, one of the light-incoming surfaces substantially parallel to one of the planes of the display panel, and the other one of the light-incoming surfaces substantially parallel to the other one of the planes of the display panel,
   wherein a thickness of each of the refractive portions of the prism increases along a direction pointing toward the lens, and the thicknesses of the two refractive portions of the prism respectively and gradually increases from the center of the prism toward two opposite ends of the prism.

2. The wearable display device according to claim 1, wherein both the planes of the display panel extend from the center line along a direction pointing toward the lens.

3. The wearable display device according to claim 1, wherein the light-incoming surfaces of the two refractive portions of the prism are respectively and directly in contact with the two planes of the display panel.

4. The wearable display device according to claim 1, wherein a horizontal reference plane is perpendicular to an optical axis of the lens, an angle between each of the light-incoming surfaces and each of the light-outgoing surfaces is α, an angle between each of the light-incoming surfaces of the prism and the horizontal reference plane is θ, a refractive index of the prism is N1, a refractive index of a medium between the light-outgoing surfaces of the prism and the lens is N2, and to satisfy a condition as following:

$N1*\sin \alpha = N2*\sin(\alpha+\theta)$.

5. The wearable display device according to claim 4, wherein the angle between each of the light-incoming surfaces of the prism and the horizontal reference plane is θ, and to satisfy a condition as following:

0 [degrees]<θ<14.0 [degrees].

6. The wearable display device according to claim 4, wherein the angle between each of the light-incoming surfaces of the prism and the horizontal reference plane is θ, and to satisfy a condition as following:

0 [degrees]<θ<12.0 [degrees].

7. The wearable display device according to claim 4, wherein the angle between each of the light-incoming surfaces of the prism and the horizontal reference plane is θ, and to satisfy a condition as following:

10.0 [degrees]<θ<12.0 [degrees].

8. The wearable display device according to claim 1, wherein a maximum thickness of each of the refractive portions of the prism is less than or equal to a minimum distance between the display panel and the lens.

9. A wearable display module, comprising:
a display panel having two planes connected to each other along a center line between the two planes, an angle between the two planes greater than 0 degrees and less than 180 degrees;
a lens facing the planes of the display panel; and
a prism disposed between the display panel and the lens, comprising two planar refractive portions connected to each other at a center of the prism along the center line, each of the refractive portions having a light-incoming surface and a light-outgoing surface, each of the light-incoming surfaces respectively facing one of the planes of the display panel, each of the light-outgoing surfaces facing the lens, an angle between the light-outgoing surfaces greater than 0 degrees and less than 180 degrees, one of the light-incoming surfaces substantially parallel to one of the planes of the display panel, and the other one of the light-incoming surfaces substantially parallel to the other one of the planes of the display panel;
wherein the light-incoming surfaces of the two refractive portions are respectively and directly in contact with the two planes of the display panel, a thickness of each of the refractive portions of the prism increases along a direction pointing away from the display panel, and the thicknesses of the two refractive portions of the prism respectively and gradually increases from the center of the prism toward two opposite ends of the prism.

10. A wearable display device, comprising:
a casing;
a display member disposed on the casing, the display member comprising two display panels connected to each other along a center line between the two display panels, each of the display panels having a plane, an angle between the planes greater than 0 degrees and less than 180 degrees;
a lens disposed on the casing, the lens facing the planes of the display panels of the display member; and
a prism, disposed between the display panels and the lens such that the prism, the display member and the lens are stacked on top of each other, the prism comprising two planar refractive portions connected to each other at a center of the prism along the center line, each of the refractive portions having a light-incoming surface and a light-outgoing surface not parallel to each other, each of the light-incoming surfaces respectively facing one of the display panels, each of the light-outgoing surfaces facing the lens, an angle between the light-outgoing surfaces greater than 0 degrees and less than 180 degrees, one of the light-incoming surfaces substantially parallel to one of the planes of the display panels, and the other one of the light-incoming surfaces substantially parallel to the other one of the planes of the display panels,
wherein a thickness of each of the refractive portions of the prism increases along a direction pointing toward the lens, and the thicknesses of the two refractive portions of the prism respectively and gradually increases from the center of the prism toward two opposite ends of the prism.

11. The wearable display device according to claim 10, wherein the display member further comprises at least one signal cable, two ends of the signal cable, which are opposite to each other, are respectively connected to the display panels.

12. The wearable display device according to claim 10, wherein the light-incoming surfaces of the two refractive portions of the prism are respectively and directly in contact with the two display panels of the display member.

13. The wearable display device according to claim 10, wherein a horizontal reference plane is perpendicular to an optical axis of the lens, an angle between each of the light-incoming surfaces and each of the light-outgoing surfaces is α, an angle between each of the light-incoming surfaces of the prism and the horizontal reference plane is θ, a refractive index of the prism is N1, a refractive index of a medium between the light-outgoing surfaces of the prism and the lens is N2, and to satisfy a condition as following:

$N1*\sin \alpha = N2*\sin(\alpha+\theta)$.

14. The wearable display device according to claim 13, wherein the angle between each of the light-incoming surfaces of the prism and the horizontal reference plane is θ, and to satisfy a condition as following:

0 [degrees]<θ<14.0 [degrees].

15. The wearable display device according to claim 13, wherein the angle between each of the light-incoming surfaces of the prism and the horizontal reference plane is θ, and to satisfy a condition as following:

0 [degrees]<θ<12.0 [degrees].

16. The wearable display device according to claim 13, wherein the angle between each of the light-incoming surfaces of the prism and the horizontal reference plane is θ, and to satisfy a condition as following:

10.0 [degrees]<θ<12.0 [degrees].

17. The wearable display device according to claim 10, wherein a maximum thickness of each of the refractive portions of the prism is less than or equal to a minimum distance between the display panels and the lens.

18. A wearable display module, comprising:
a display member, comprising two display panels connected to each other along a center line between the two display panels, each of the display panels having a plane, an angle between the planes of the display panels is greater 0 degrees and less than 180 degrees;
a lens facing the planes of the display panels of the display member; and
a prism disposed between the display panels and the lens, comprising two planar refractive portions connected to each other at a center of the prism along the center line, each of the refractive portions having a light-incoming surface and a light-outgoing surface, each of the light-incoming surfaces respectively facing one of the planes of the display panels, each of the light-outgoing surfaces facing the lens, an angle between the light-outgoing surfaces greater than 0 degrees and less than 180 degrees, one of the light-incoming surfaces substantially parallel to one of the planes of the display panels, and the other one of the light-incoming surfaces substantially parallel to the other one of the planes of the display panels;
wherein the light-incoming surfaces of the two refractive portions are respectively and directly in contact with the two display panels of the display member, a thickness of each of the refractive portions of the prism increases along a direction pointing away from the display member, and the thicknesses of the two refractive portions of the prism respectively and gradually increases from the center of the prism toward two opposite ends of the prism.

* * * * *